United States Patent
Geyer

(10) Patent No.: US 6,811,444 B2
(45) Date of Patent: Nov. 2, 2004

(54) TERMINAL BLOCK WITH SEVERAL RECEPTACLES FOR AC AND DC

(75) Inventor: Peter Geyer, Vienna (AT)

(73) Assignee: Geyer Import-Export Gesellschaft m.b.H., Vienna (AT)

( * ) Notice: Subject to any disclaimer, the term of this patent is extended or adjusted under 35 U.S.C. 154(b) by 0 days.

(21) Appl. No.: 10/268,693

(22) Filed: Oct. 11, 2002

(65) Prior Publication Data

US 2003/0073342 A1 Apr. 17, 2003

(30) Foreign Application Priority Data

Oct. 11, 2001 (AT) .................................. GM780/2001 U

(51) Int. Cl.[7] .............................................. H01R 25/00
(52) U.S. Cl. ...................................... 439/650; 307/38
(58) Field of Search ................................ 439/650, 653, 439/214, 652; 307/38, 141; 363/146

(56) References Cited

U.S. PATENT DOCUMENTS

| | | | | |
|---|---|---|---|---|
| 4,532,513 A | * | 7/1985 | Halvorson | 340/971 |
| 4,650,974 A | * | 3/1987 | Le Moine | 235/101 |
| 5,277,620 A | * | 1/1994 | Taylor | 439/488 |
| 5,278,771 A | * | 1/1994 | Nyenya | 307/38 |
| 5,424,903 A | * | 6/1995 | Schreiber | 361/166 |
| 5,742,466 A | | 4/1998 | Kram | |
| 5,900,684 A | * | 5/1999 | Lam | 363/146 |
| 6,061,261 A | | 5/2000 | Chen et al. | |
| 6,211,581 B1 | * | 4/2001 | Farrant | 307/38 |
| 6,445,087 B1 | * | 9/2002 | Wang et al. | 307/40 |
| 6,509,655 B1 | * | 1/2003 | Wang | 307/38 |

FOREIGN PATENT DOCUMENTS

| | | |
|---|---|---|
| DE | 298 08 882 U1 | 9/1998 |
| DE | 201 00 246 U1 | 5/2001 |
| DE | 101 06 025 A1 | 8/2002 |
| EP | 1 231 681 A1 | 8/2002 |
| GB | 2 218 274 A | 11/1989 |

* cited by examiner

Primary Examiner—Neil Abrams
(74) Attorney, Agent, or Firm—Young & Thompson

(57) ABSTRACT

A terminal block in the form of a terminal strip with several connecting sites has first connecting sites for 220/230 volts and second connecting sites for low DC voltage (6 to 15 volts), and the connecting sites can be supplied with voltage individually or in groups, independently of one another. The terminal block is controlled using an integrated control panel and/or using a processor 36 joined to switches (11, 15), the processor being controlled via a USB terminal 20 through cable connection to a computer. The control and display panels (4, 6) may be removed when the computer and processor are used for switch control.

15 Claims, 4 Drawing Sheets

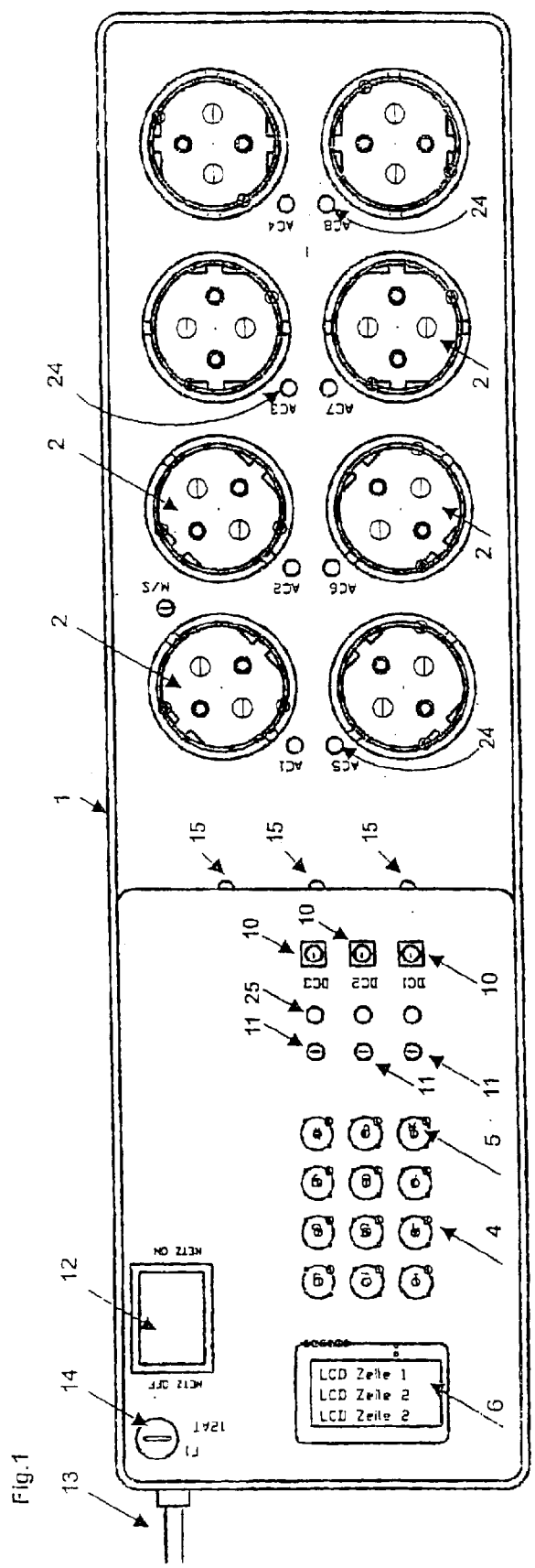
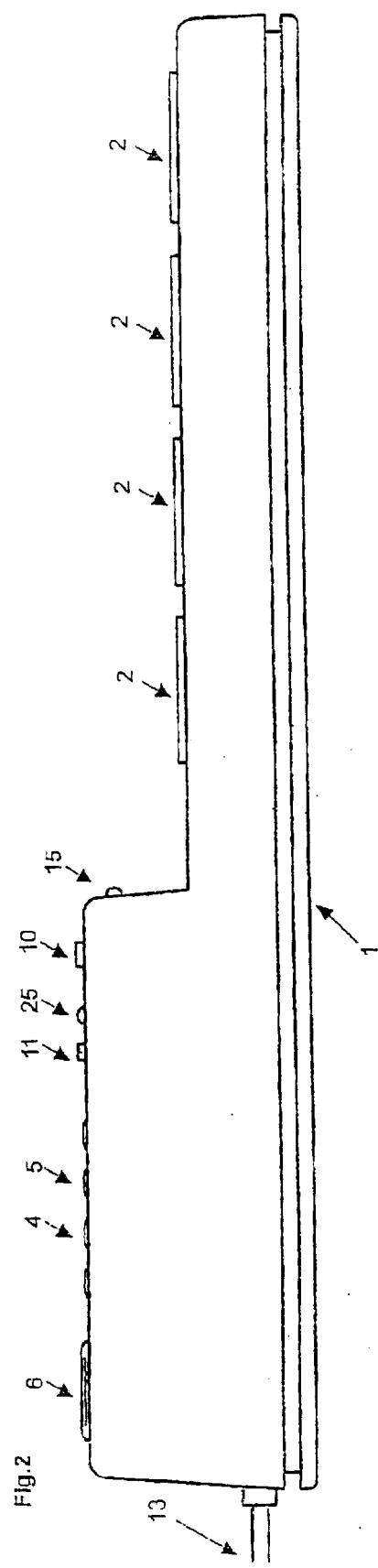

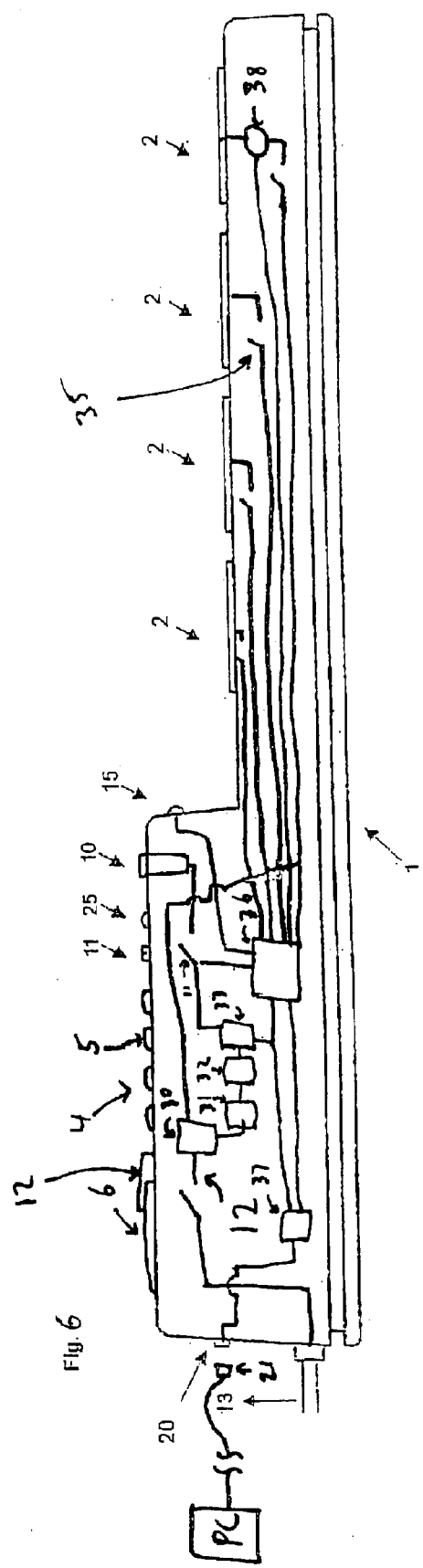

TERMINAL BLOCK WITH SEVERAL RECEPTACLES FOR AC AND DC

BACKGROUND OF THE INVENTION

The invention relates to a terminal block with several receptacles.

Existing terminal blocks (table-top terminal blocks) make it possible to connect several devices. Here connecting the receptacles of the table-top terminal block using a common switch or separate switches to the grid or separating them from the grid is known. Combining the switch of known table-top terminal blocks with a light source so that it shows red for example when the outlets of the known table-top terminal blocks are connected to the grid is also known.

The object of the invention is to devise a table-top terminal block with several outlets which can be used in a versatile manner, and in which the outlets can be connected to the grid individually and independently of one another and alternately directly, time-controlled and/or in groups, therefore can be supplied with voltage.

SUMMARY OF THE INVENTION

In the terminal block as claimed in the invention which has several connection possibilities, the devices connected to the terminal block can be supplied with current whenever they are needed, and independently of one another.

For example, the terminal block as claimed in the invention can have up to fifteen connection possibilities with 230 V.

In one embodiment the terminal block as claimed in the invention is equipped with at least one integrated power supply unit, and there are for example three connection sites with 6 to 15 V. This makes it possible to connect a PC/notebook, and/or the pertinent peripherals, such as the monitor, printer, scanner, active USB HUB, ForceFeed joystick and various auxiliary drives, streamer, CD, CD burner, DVD, wireless mouse, ISDN/modem/tel/fax-answering machine without its own power supply unit being needed and if necessary to supply it with current.

The device as claimed in the invention can be controlled either via a keypad which has been integrated into the device or via USB from a computer. The interface part via a USB input which is connected to the PC, the USB connector is located for example on the front side on the device [sic]. The interface part can, like the programming part, be connected via a serial 2-wire connection (I2C-like) to a timer module. This enables use of an economical, four-pole RJ5 coiled cable for connection to the system if the interface part is to be removable.

Here it is provided in one embodiment that the panel integrated in the terminal block of the invention, for example a key panel with a LCD display, can be removed so that remote control is possible. If the keypad is removed from the device as claimed in the invention, the opening which has formed thereby in the terminal block can be closed by a cover.

In one embodiment the device as claimed in the invention is provided with a light source which can be connected separately, and operation of the device, especially plugging in consumers in the dark, is simplified.

In the terminal block as claimed in the invention individual or several 230 V connecting sites or power supply unit connections with 6 to 15 V direct current can be combined with timers so that, for example, it can be determined via the keypad which is integrated into the terminal block and/or via a computer connected via USB whether and when the connected devices are being supplied with current and when not.

In another embodiment it can be provided that the terminal block as claimed in the invention is remotely controlled via a remote control, via a telephone, infrared, Blue-Tooth or via an ISDN system. i.e. selected connections (receptacles or power supply unit terminals) are turned on or off.

In addition, the terminal block as claimed in the invention can be turned on or off in its entirety via a main switch or an illuminated rocker switch.

Turning the individual consumers and lighting on and off can be programmed in one embodiment, preferably by an external computer via a USB interface or the aforementioned internal and selectively removable actuator with a LCD display and controls (keys).

In one embodiment, in the terminal block as claimed in the invention a grid load circuit (receptacle) can assume a master function and in cases turn the other grid load circuits (slave) on and off based on the master power consumption and programming. In addition, the user is enabled moreover to switch devices which are connected to the common strip in freely definable group.

As soon as the main device (master) is turned on, the defined connections (slaves) are automatically turned on at the same time.

The individual clock timer or the one belonging to all connections can be made such that it works on a weekly cycle, the smallest time unit being for example one minute. Thus the user is enabled to switch devices which are connected to the plug-on terminal strip as claimed in the invention individually and in a freely definable manner, with time control, and for each individual receptacle of the strip several timers on/off switching times can be indicated [sic].

The switching instants can be selectively determined for all days, individual days, work days, or the weekend.

The power supply parts installed in one embodiment in the terminal block as claimed in the invention can be used for the internal power supply of the terminal block for its lighting and for low voltage connections. Here it is optionally possible to continuously adjust each of the low voltage connections by a rotary switch to the desired voltage, for example 6 V or 9 V or 12 V or 15 V. If the terminal strip as claimed in the invention is equipped with a power supply unit, and for example three power supply unit connections with 6 to 15 V are available which optionally can be continuously set by a rotary switch to the desired voltage, for example 6 V or 9 V or 12 V or 15 V, and are connected directly as a slave or tuner, it is possible to connect a notebook or peripheral devices, such as a printer, scanner, active USB-HUBS, joysticks, various auxiliary drives, such as a CD, DVD, CD burner, wireless keyboard/mouse, ISDN modem/A-B converter, wireless headset, phone/fax/answering machine, various Christmas lights, illuminated wall clocks, etc, without its own power supply being needed, and to supply them with current if necessary.

The power supply of the terminal block as claimed in the invention takes place for example via a permanently connected (three-pole) line, the power supply being safeguarded by a fuse installed in the terminal block or a glass tube fuse which is accessible from the outside.

In one embodiment of the terminal block as claimed in the invention, there can be grid filtering, and the grid filter can consist of two Y1 capacitors (1 nF), two X1 capacitors (100 nF) and a current-compensated reactor 230 V/16A.

In addition, in the terminal block as claimed in the invention overvoltage protection of conventional design can be integrated.

Grid overvoltage protection: coarse protection in the feed and outgoing cables by SIOV varistors, fine protection in the outgoing cables by high-speed semiconductors.

Low voltage overvoltage protection: fine protection in the outgoing cables by high-speed semiconductors.

It should be pointed out again that the outlets for the 230 V are connected for example via relays. Here triggering of the relays can take place via the clock timer, via the keypad, or via a USB interface from a computer.

The housing of the terminal block as claimed in the invention or at least part of it, preferably the upper part of the housing, can consist of a translucent material (plastic) so that the entire device is illuminated from the inside by a built-in light source, for example a low-voltage filament lamp. The lighting is activated either via a separate switch or via a clock timer, but can also be programmed as a "slave". The execution of the terminal block as claimed in the invention with an integrated light source is used for easier handling when devices are plugged in/unplugged, and as lighting of the entire terminal strip in a transparent plastic execution as (from the inside) and can be turned on directly on the strip and are indicated (programmed) as the timer and in the group (master/slave). The housing of the switch strip as claimed in the invention which is translucent (colored or transparent) in one embodiment by the central arrangement of a commercial and economical low-voltage filament lamp makes it possible to have the entire device "light" from the inside. The lighting is activated either directly by a key (the initial activation turns on the lighting, the second turns the lighting off, the third turns the light back on, etc). Furthermore, the lighting can also be programmed via a clock timer and as a "SLAVE".

The timer module provided in the terminal block as claimed in the invention in any case contains the necessary electronics for the entire internal process control, triggering of the grid relays, the lighting and the switching devices for the low-voltage outputs. Likewise the timer module supplies all light emitting diodes which are used to displays states and accepts the operating commands of the integrated control keys and continues to process them. The timer module can be connected via a serial two-wire connection (I2C-like) to the programming part (alternatively to the interface part).

The panel of the terminal block as claimed in the invention can have a LCD display and control keys for manual operation. This programming part is made alternatively to the interface part when the programming is to be executed by hand, directly on the terminal block, not via an external computer.

To simplify control, the control panel (programming part) can be connected via a line to the actual terminal block and can be removed, the connection for example taking place via a coiled cable. For example the programming part contains in addition to the LCD display twelve keys for operating and programming of the terminal block as claimed in the invention.

The interface part optionally provided in the terminal block as claimed in the invention has a USB input which is connected to a computer (PC). Here the USB connector is located on one of the side surfaces (preferably the narrow side) of the terminal block as claimed in the invention.

The clock timer provided in one embodiment in the terminal block as claimed in the invention can also be coupled to an acoustic converter, for example to a piezo-acoustic converter, so that the terminal block as claimed in the invention can also be used as an alarm bell.

The programming of the device as claimed in the invention makes it possible to block one or more outgoing cables at certain times.

In one embodiment the terminal strip as claimed in the invention offers up to fifteen 230 V terminals. Eight grounding-type receptacles arranged in two rows, of which seven grounding-type receptacles can be made as multi-receptacles, two Euro plugs fitting in one grounding-type receptacle, and being connected directly as a slave or timer.

The terminal strip as claimed in the invention can also be made in one row and offers for example eleven terminals. Six grounding-type receptacles arranged in one row, of which five grounding-type receptacles are made as multi-receptacles, two Euro plugs fitting into one grounding-type receptacle, and being connected directly as a slave or timer.

Since table-top terminal blocks (terminals strips) are often also set up at poorly accessible locations (on the floor, behind the desk, behind devices in racks, etc.) the operation/handling acquires special importance.

In the PC-USB configuration the terminal strip as claimed in the invention can be connected to the PC by means of USB cable and can be triggered/switched/adjusted by means of software. The separate actuator part is not necessary here.

If the PC is not equipped with a USB connection, or the terminal strip as claimed in the invention is being used for another purpose, for example in stereo/video systems or others, the user is enabled to operate the terminal strip as claimed in the invention via the "keypad with LCD display", therefore to adjust it to the state desired at the time.

Monitoring of the settings of the terminal strip as claimed in the invention is possible in the USB version by means of PC software, the current status being displayed on the monitor.

In the control panel version the current status on the keypad of the actuator is displayed by means of light-emitting diodes.

The terminal strip as claimed in the invention can also offer increased safety and good protection.

In the past, unoccupied connecting sites on known, live terminal strips have been a risk to children if various small parts were inserted therein; in the invention however unoccupied connecting sites can be easily deactivated.

In embodiments the device as claimed in the invention offers for example at least one of the following functions:

power consumption measurement of the "MASTER" receptacle and display on the LCD display.

additional installation of a piezo-acoustic converter in order to be able to use the AT080 as an "alarm/ringer".

monitoring of the connected devices for antitheft purposes.

the possibility of blocking one or more outgoing circuits at certain times (child protection for example for television sets, and others).

control by infrared/wireless/Blue Tooth module.

The terminal block as claimed in the invention with several receptacles can also be programmed such that for example another profile for operation of devices during the weekend can be loaded in the internal memory of the terminal block and only after a certain, definable time interval or at a certain, definable time is it activated. This prevents a profile for turning on and off the individual receptacles of the terminal block which is intended for a future time interval (for example, the weekend), from being immediately activated and the devices required at the time, for example, a computer or a printer, from being switched off-circuit, against wishes. This programming possibility makes it possible to program future switching of the terminal block beforehand in order to supply current to only certain, selected devices, for example, a telephone answering machine and/or a fax machine, for example over a weekend or during a stipulated time interval.

BRIEF DESCRIPTION OF THE DRAWINGS

Other details and features of the terminal block as claimed in the invention also derive from the following description of preferred embodiments with reference to the attached drawings.

FIG. 1 shows in an overhead view one embodiment of the terminal block as claimed in the invention with the control panel, FIG. 2 shows the terminal block from FIG. 1 in a side view, FIG. 6 shows a side view of a circuit diagram that includes components for both FIGS. 1 and 3.

DETAILED DESCRIPTION OF THE PREFERRED EMBODIMLENTS

Figure 3:
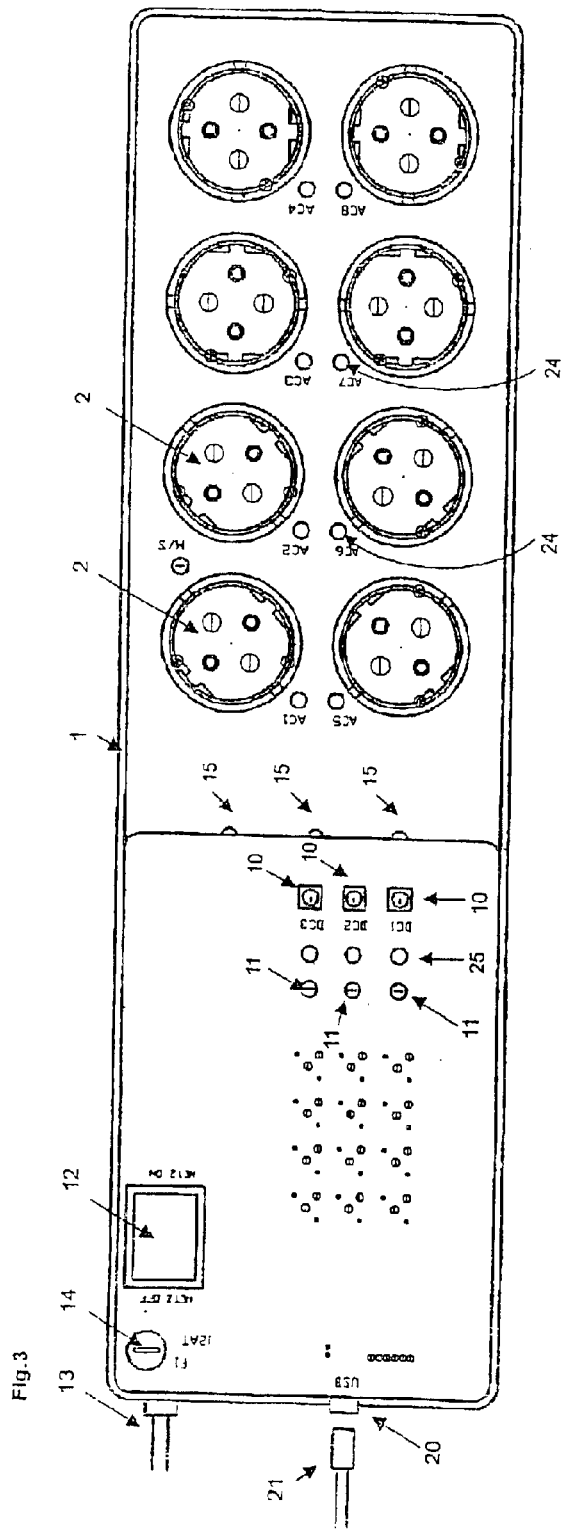
FIG. 3 shows another embodiment of a terminal block as claimed in the invention.

In the embodiment shown in FIGS. 1 and 2, the terminal block 1 as claimed in the invention has eight receptacles 2 next to one another in two rows; they can be supplied individually and independently of one another with 230 V. Next to each receptacle 2 there is a light emitting diode 24 which lights when the receptacle assigned to it is turned on.

In the elevated part of the housing of the terminal block 1 there is a control panel 4 with control keys 5 and a display 6 which can be made for example as a LCD display. Furthermore, in the embodiment shown in FIGS. 1 and 2 there are three terminals 10 supplied with DC voltage via the built-in power supply units. A (rotary) switch 11 is assigned to each of the power supply unit terminals 10; using the switch the voltage applied to the respective terminal 10 can be set to the desired value, for example 6, 9, 12 or 15 V, optionally, the voltage applied to the respective terminal 10 can be changed continuously. Here each switch 11 is located next to the power supply unit terminal 10 functionally assigned to it. A light emitting diode 25 is assigned to each terminal 10 and lights when the power supply unit terminal 10 adjacent to it is turned on with 6/9/12/15 V.

Furthermore, in the terminal block there is a main switch 12 with which the entire terminal block can be separated from the voltage supplied via the line 13.

In the housing of the terminal block there is still a fuse 14. For example, on one side wall of the elevated part of the housing 1 there is at least one light source 15, in the example, three light sources.

In the area of the main switch 12 there can also be a light switch for the light source 15.

The control panel 4 with the keys 5 and the display 6 can be removed.

All receptacles 2 of the terminal strip 1 as claimed in the invention can be made as double receptacles, so that two Euro plugs can be plugged into each receptacle 2.

In one embodiment of a terminal strip as claimed in the invention which is not shown it has six receptacles 2 arranged in a row.

Figure 4:
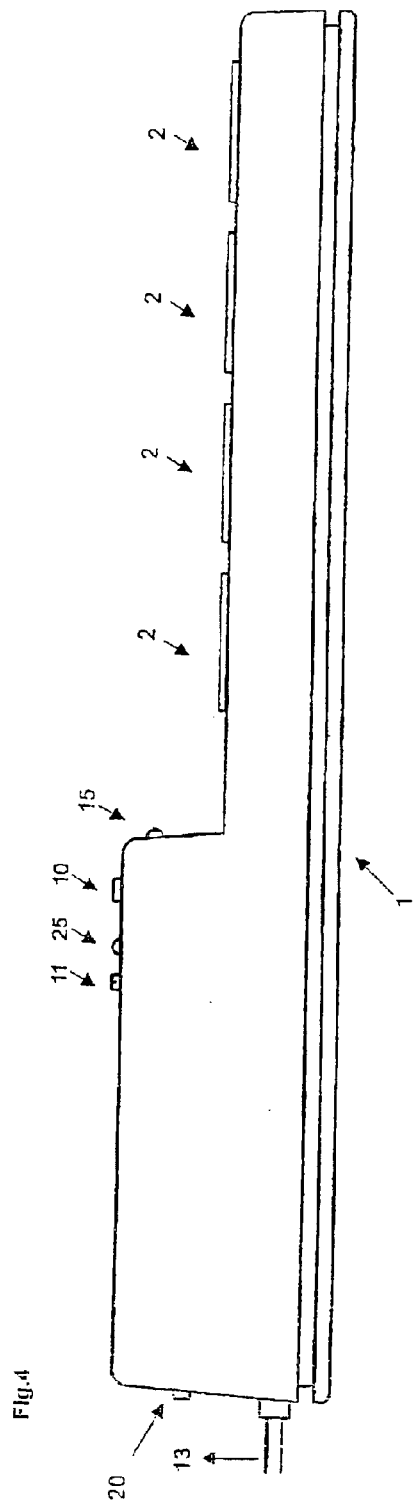
FIG. 4 shows the terminal block from FIG. 3 in a side view.

The embodiment of the terminal strip 1 which is shown in FIGS. 3 and 4 has, like the embodiment shown in FIGS. 1 and 2, eight receptacles 2 and three power supply unit terminals 10 with the voltage selector switches 11 assigned to them and additionally shows one terminal 20 for USB cable via which the terminal strip 1 can be connected to a PC. In the embodiment as shown in FIGS. 3 and 4 there are no control panel 4 and no display 6, since here control takes place via a connected PC. Of course it is also conceivable to align the terminal strip 1 from FIGS. 1 and 2 with a USB interface so that then control can take place via the control panel (optionally removed from terminal strip 1) or via the PC. Next to the control panel 4 there can be a switch for the light source 15 which can also be located within the upper housing half. When the upper housing half of the terminal strip 1 as claimed in the invention consists of transparent or translucent material which can also be colored when the light source 15 is turned on, the terminal strip 1 is illuminated from the inside so that its operation, especially plugging in and unplugging by the consumers, is simplified.

The basic structure of the electrical/electronic circuit of the terminal block of FIG. 1 is explained below using the circuit diagram of FIG. 5.

Figure 5:
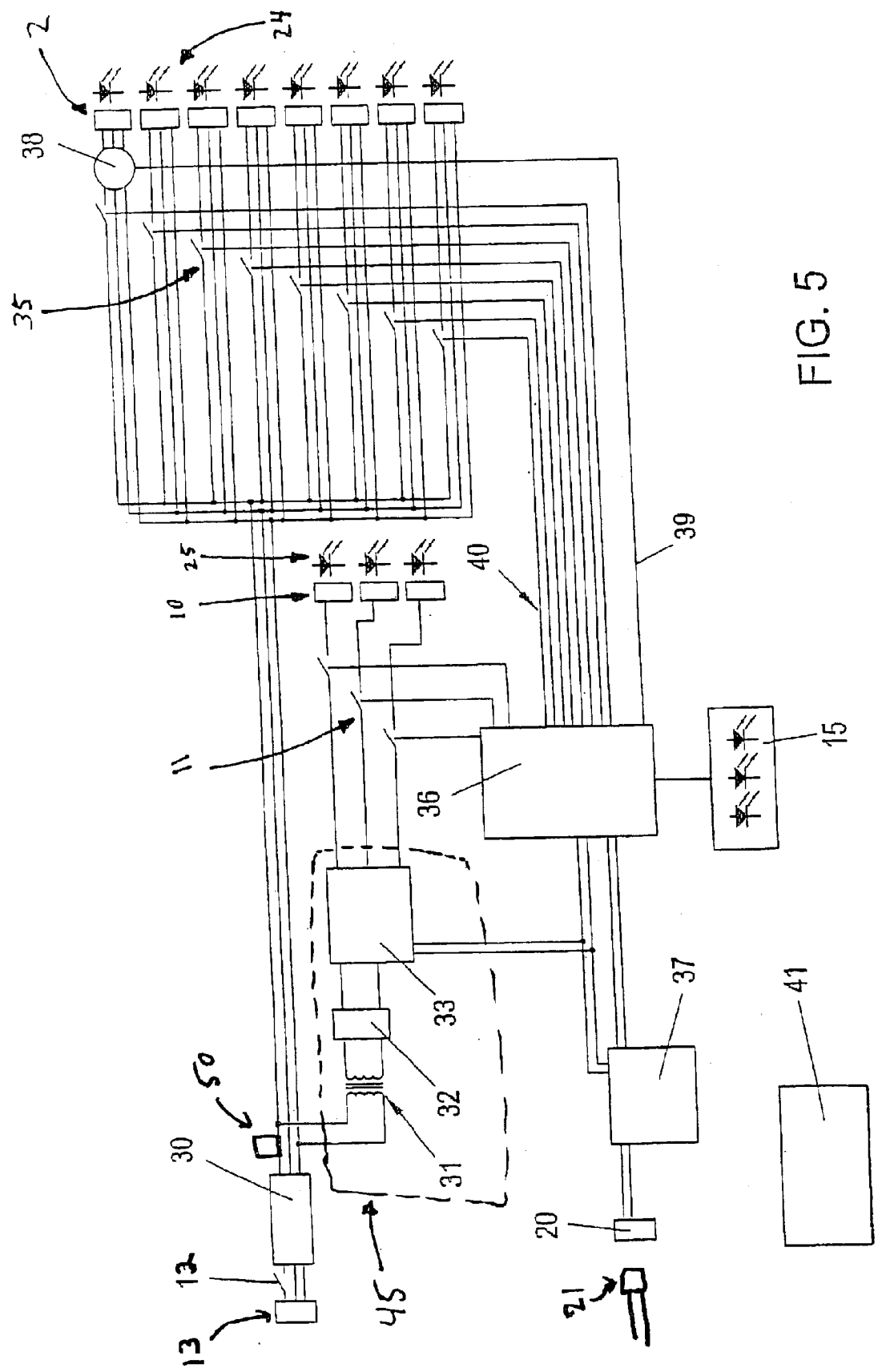
FIG. 5 shows a circuit diagram that includes components for FIGS. 1 and 3.

Since FIG. 1 and FIG. 3 are essentially the same except that in FIG. 3, the removable control panel 4, control keys 5 and display 6 are removed, as set forth above, and thus the circuit diagram of FIG. 5 is equally applicable to FIG. 3.

The terminal block is supplied with current via a grid terminal (not shown). In the grid filter 30 all faults which originate from the grid are filtered out so that the devices connected to the terminal block receive a clean supply.

In order to supply the module with low voltage, a power supply unit 45 that includes a transformer, a voltage converter, and a rectifier is used, wherein the incoming voltage of 230 V is converted in the transformer 31 to 20 V. The DC voltage is delivered to the DC voltage converter 33 by the rectifier 32. This voltage converter 33 produces four independent, but not isolated voltages. These voltages are used for the internal voltage supply and for the three DC outputs 10. The three DC outputs 10 independently of one another can be supplied with a continuously adjustable voltage via three voltage regulators which are installed in the DC voltage converter 33.

A processor 36 is responsible for all real time tasks, such as clock timed switching using a clock timer 50 and master-slave switching, and for communication with the program of the terminal block. The processor 36 communicates on the one hand with the USB control logic 37 which is responsible for the correct signal conversion for the USB connection 20. On the other hand, the processor 36 is responsible for triggering all outputs via the control lines 40. The outputs are switched by means of the relays (drawn as switches 11, 35) to the DC outputs 10 and to the receptacle outputs 2 respectively. Each of the relays in addition turns on the optical display element (LED 24, 25) so that it can be recognized which outputs are switched on.

Upstream of the output of the receptacle 2 which is the uppermost in the circuit diagram there is a current flow sensor 38 which reports the current flow on the master receptacle to the processor via the current signal line 39.

Optional components 41 are connected either to the USB connection 20 or directly to the processor 36. Optional components are an acoustic source, actuator and the display part.

Internal lighting 15 is triggered directly from the processor 36. The trigger for the lighting 15 can be a corresponding command from the program of the terminal block or pressing a key on the actuator.

In summary, one embodiment of the invention can be described as follows:

A terminal block in the form of a terminal strip 1 with several connecting sites has connecting sites 2 for 220/230 volts and connecting sites 10 for low voltage (6 to 15 volts), and the connecting sites 2, 10 can be supplied with voltage individually or in groups, independently of one another. The terminal block as claimed in the invention which can also contain a clock timer is controlled using an integrated control panel 4 and/or via a USB connection 20 via a computer.

What is claimed is:

1. A terminal block comprising:
    a plurality of first receptacles;
    a plurality of second receptacles receiving a current flow different from said plural first receptacles;
    a plurality of switches for supplying said first and second receptacles with voltage individually and in groups;
    a control panel having a plurality of keys that correspond to a respective one of said first and second receptacles for individually controlling current flow to each of said first and second receptacles;
    a single display panel indicating which of the plural first and second receptacles are receiving said current flow;
    a USB terminal via which the terminal block may be connected to a computer using a USB cable; and
    a processor for converting a signal for the USB terminal and for controlling current flow to said first and second receptacles,
    wherein at least one of said plural switches is a main switch.

2. The terminal block as claimed in claim 1, wherein the plural first receptacles are supplied with alternating current and the plural second receptacles are supplied with direct current.

3. The terminal block as claimed in claim 2, wherein the plural second receptacles are supplied with voltage by a power supply unit located in the terminal block.

4. The terminal block as claimed in claim 3, further comprising a plurality of voltage selection switches, each said plural second receptacles being assigned a respective one of said plural voltage selection switches.

5. The terminal block as claimed in claim 4, wherein each of said plural voltage selection switches are continuously adjustable between 6, 9, 12 and 15 volts.

6. The terminal block as claimed in claim 1, further comprising a plurality of light-emitting diodes connected to a respective one of said plural first and second receptacles.

7. The terminal block as claimed in claim 1, further comprising at least one light source within a housing of said terminal, wherein at least part of the housing consists of transparent/translucent material.

8. The terminal block as claimed in claim 1, wherein at least one of said plural first receptacles is a master and at least another one of said plural first receptacles is a slave.

9. The terminal block as claimed in claim 1, wherein the display panel is a liquid crystal display.

10. A terminal block comprising:
    a plurality of receptacles;
    a plurality of switches for supplying said receptacles with voltage individually and in groups;
    a USB terminal via which the terminal block may be connected to a computer using a USB cable;
    a processor for converting a signal for the USB terminal and for controlling current flow to said receptacles; and
    a removable control panel having a plurality of keys that correspond to said receptacles for individually controlling current flow to each of said receptacles,
    wherein at least one of said plural switches is a main switch, and
    wherein said processor is at least initially programmable via the USB cable using a personal computer.

11. The terminal block according to claim 10, wherein said plural receptacles comprise:
    a plurality of first receptacles; and
    a plurality of second receptacles receiving a current flow different from said plural first receptacles.

12. The terminal block as claimed in claim 11, wherein said plural switches supply said first and second receptacles with voltage individually and in groups.

13. The terminal block as claimed in claim 12, further comprising a single display panel indicating which of the plural first and second receptacles are receiving said current flow.

14. The terminal block as claimed in claim 10, wherein said plural switches supply said plural receptacles with voltage by one of direct switching such that said plural receptacles are connected to a computer, clock timed switching such that switching is controlled by a clock timer having programmed times, and master/slave switching such that switching is controlled by a master/slave configuration whereby the slaves are dependent on power consumption of the master.

15. The terminal block as claimed in claim 10, wherein said plural switches supply said plural receptacles with voltage wherein at least one of said plural receptacles is a master and at least another one of said plural receptacles is a slave.

* * * * *